United States Patent [19]

Royer

[11] Patent Number: 4,645,410

[45] Date of Patent: Feb. 24, 1987

[54] BLADE-EQUIPPED VEHICLE TREE GRIPPING MEANS

[75] Inventor: Armand Royer, Amos, Canada

[73] Assignee: Julien Royer, Quebec, Canada

[21] Appl. No.: 850,062

[22] Filed: Apr. 7, 1986

Related U.S. Application Data

[63] Continuation of Ser. No. 617,461, Jun. 4, 1984, abandoned.

[51] Int. Cl.$^4$ .................................................. B66C 3/00
[52] U.S. Cl. ..................................... 414/740; 414/729; 414/731; 294/104; 37/117.5; 37/DIG. 12
[58] Field of Search ...................... 414/680, 729, 740; 294/104

[56] References Cited

U.S. PATENT DOCUMENTS

| 3,239,082 | 3/1966 | Herolf | 414/694 |
| 3,273,729 | 9/1966 | Holopainen | 414/694 |
| 3,333,717 | 8/1967 | Scaperotto | |
| 3,709,390 | 1/1973 | Tanguay | 414/731 |
| 3,933,261 | 1/1976 | Marostica | |
| 4,140,233 | 2/1979 | Muntjanoff | |
| 4,355,476 | 10/1982 | Engkvist | 37/117.5 |
| 4,403,906 | 9/1983 | Holopainen | 414/729 |

FOREIGN PATENT DOCUMENTS

| 817136 | 7/1969 | Canada. |
| 847172 | 7/1970 | Canada. |
| 888561 | 12/1971 | Canada. |
| 900416 | 5/1972 | Canada. |
| 967617 | 5/1975 | Canada. |
| 996509 | 9/1976 | Canada. |
| 1003789 | 1/1977 | Canada. |
| 1009613 | 5/1977 | Canada. |

Primary Examiner—Joseph J. Rolla
Assistant Examiner—Jay I. Alexander
Attorney, Agent, or Firm—Edwin E. Greigg

[57] ABSTRACT

An improved vehicle for working in a forest, of the type comprising a pusher blade movable up and down. This vehicle is improved in that it further comprises a tree gripping unit mounted laterally of the blade at one end thereof, in a position to pick up a tree lying on the ground. An actuator is provided for actuating the tree gripping unit from the cabin of the vehicle.

4 Claims, 4 Drawing Figures

BLADE-EQUIPPED VEHICLE TREE GRIPPING MEANS

This is a continuation of copending application Ser. No. 617,461 filed June 4, 1984 now abandoned.

The present invention is concerned with improvements in handling felled trees.

More particularly, the invention relates to an improvement in a blade-equipped vehicle for handling felled or fallen trees.

Skidders used to haul a group of felled trees, are often equipped with a blade at one end so that the skidder can also be used to push the trees or to clear brush or tree limbs. When the skidder is hauling a group of felled trees, it often happens that one or more trees falls off the skidder. It is very consuming to collect these fallen trees and they often are left where they lie resulting in waste.

Bulldozers are often employed in forestry operations to clear parts of forested land. Fallen trees however often make the cleaning operation difficult, or at least awkward, since the fallen trees are moved transversely by the bulldozer blade and catch standing trees. It is uneconomical to use a skidder to handle such fallen trees on an individual basis.

The object of the present invention is to provide an improvement on blade-equipped vehicles, such as skidders or bulldozers, whereby one or two felled or fallen trees can be easily handled by such vehicles.

In accordance with the present invention, tree gripping means are mounted on one end of the blade of the vehicle and are positioned to grip a tree lying on the ground. With the blade of the vehicle raised, the vehicle is moved to position the tree gripping means above the tree. The blade is then lowered to place the tree gripping means about the tree and the gripping means are then actuated to grip the tree. The blade is then raised and the vehicle moved to move the gripped tree to a desired location.

When the tree-gripping means are mounted on a blade on a skidder, the skidder operator can easily pick up one or two fallen trees during each trip. When the tree-gripping means are mounted on a bulldozer blade, the operator can easily maneouver the machine to pick up a fallen tree and move it out of the way without damaging standing trees.

The invention is particularly directed toward an improved vehicle for working in a forest, of the type comprising a pusher blade at one end with means for moving the blade up and down relative to the vehicle. This vehicle is improved in that it further comprises tree gripping means outwardly mounted at one end of the pusher blade in a position to pick up a tree lying on the ground, and means for operating the tree gripping means to grip a tree lying on the ground.

The tree gripping means comprises a base fixed to the one end of the blade in a vertical position. This base has a lower portion forming a fixed jaw. The tree gripping means also comprises a movable jaw mounted by a pivot pin on the base above the portion of said base forming the fixed jaw.

The operating means comprises an actuator forming the movable jaw with respect to the fixed one. Preferably, this actuator is pivotally mounted at one end to the top end of the base and at the other end to a point of the movable jaw positioned outwardly of the pivot pin of said movable jaw.

The invention will now be described in detail with reference to the following non-restrictive description of a preferred embodiment thereof, taken in connection with the accompanying drawings in which.

Figure 1:
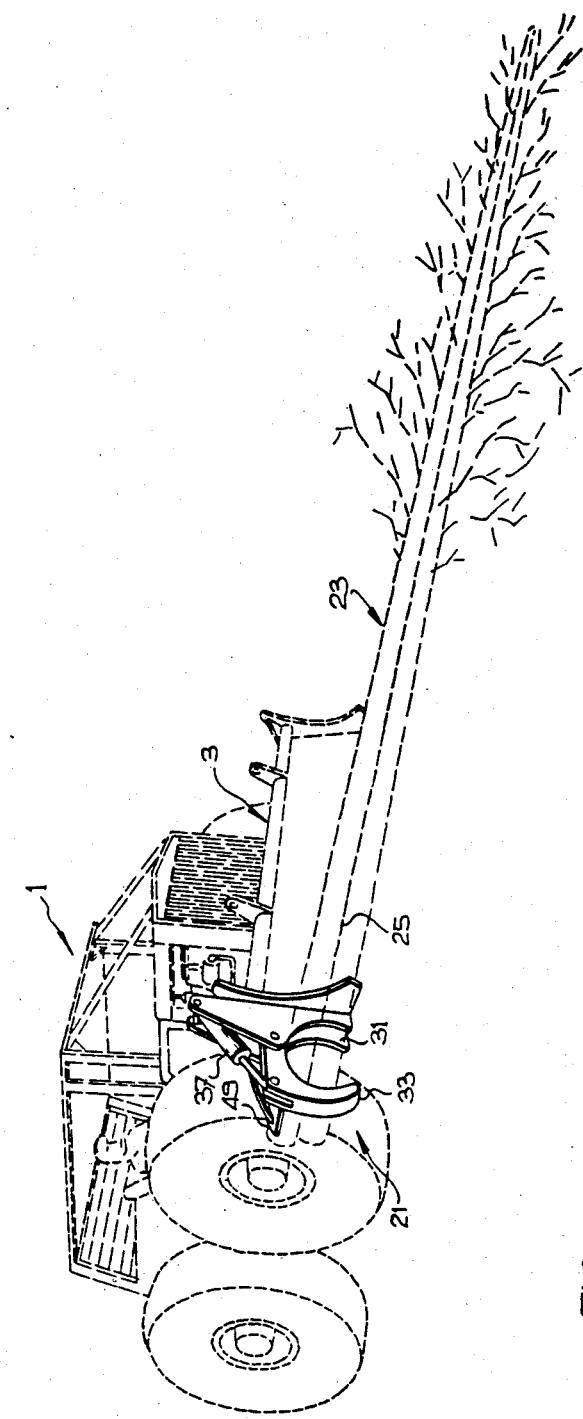
FIG. 1 is a perspective view of a blade-equipped vehicle according to the invention in operation.

The vehicle 1 as shown in the drawings, has a pusher blade 3 mounted at its front end. The blade 3 is used to move brush and/or tree limbs. A pair of arms 5 and 7 extend rearwardly from the blade 3, one on each side of the vehicle 1 as shown in FIG. 2. The free ends 9 and 11 of the arms 5 and 7 respectively are pivotally connected to the vehicle frame by pivot pins 13 and 15. Hydraulic actuators 17 and 19 are pivotally connected at one end to the arms 5 and 7 respectively between the blade 3 and their ends 9 and 11. The other ends of the actuators 17 and 19 are connected to the frame of the vehicle 1 above the arms 5 and 7. Operation of the actuators 17 and 19 in one direction will lower the blade 3 to the ground, and in the other direction will raise the blade 3 up off the ground, as is well known.

Figure 3:
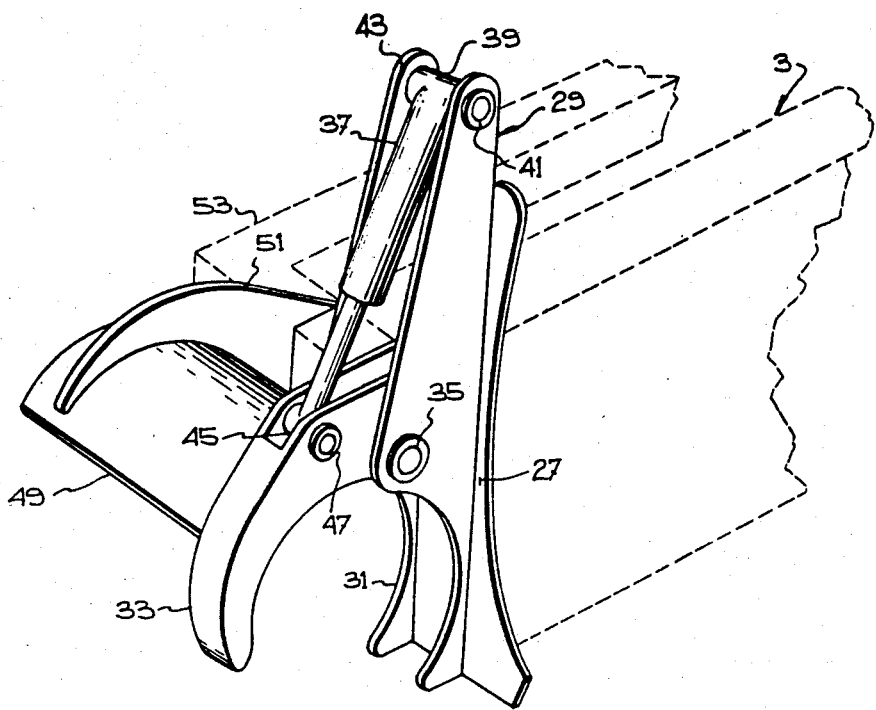
FIG. 3 is a perspective view of the vehicle blade with the tree gripping means thereon.

In accordance with the invention, means 21 are mounted on the blade 3 in a position for gripping a tree 23, lying on the ground by its trunk 25. The gripping means 21 is mounted at one end 27 of the blade 3 as shown in the drawings. The gripping means 21 as shown in FIG. 3, has a vertical extending base 29 the lower portion of which forms a fixed jaw 31. The base 29 is fixedly mounted laterally to the end 27 of blade 3 by welding or other suitable means. A movable jaw 33 is pivotally mounted to the base 29, just above the fixed jaw 31, by a pivot pin 35. The jaw 33 is curved to extend outwardly and downwardly from the base 29. A hydraulic actuator 37 is pivotally mounted at one end 39, by a pivot pin 41, to the top end 43 of the base 29. The other end 45 of the actuator 37 is pivotally mounted by a pivot pin 47 to the movable jaw 33 at the point positioned outwardly of the pivot pin 35. Operation of the actuator 37 will move the jaw 33 toward or away from the fixed jaw 31.

If desired, a stop or abutment plate 49 can be provided, adjacent the jaws 31 and 33. The plate 49 is curved about an axis which extends parallel to the pivot pins 35, 41 and 47 to have the convex side of the plate face the ground. A brace 51 connects the plate 49, via its top side to a brace 53 extending rearwardly from the blade 3.

In operation, the vehicle operator maneuvers the vehicle 1 to place the open gripping means 21 above a fallen or dropped tree 23 lying on the ground while the blade 3 is raised. Once the gripping means 21 are properly located, the blade 3 is lowered via actuators 17, 19 to position the jaws 31 and 33 of the gripping means 21 on either side of the trunk 25 of the tree 23. The actuator 37 is then operated by the vehicle operator to move the jaw 33 toward the jaw 31 to securely grip the tree, and the blade 3 is then raised. The gripped tree is held against the stop plate 49. The stop plate 49 prevents the tree from tilting up while gripped. The vehicle 1 is then moved carrying the tree 23 just picked up. More then one tree can be picked up in this manner.

Figure 2A:
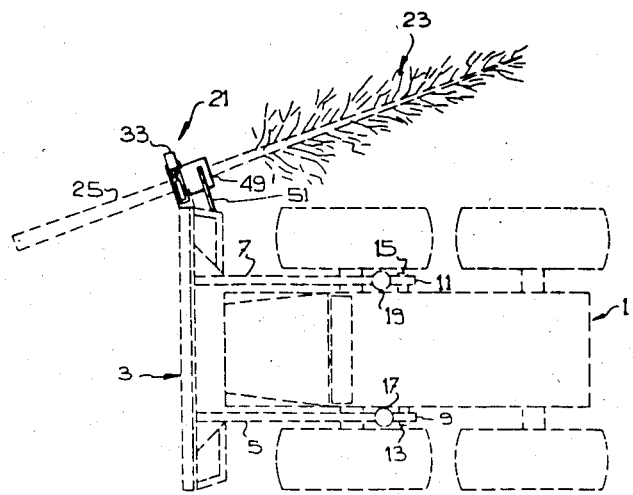
FIGS. 2a, 2b are plan views of the vehicle in operation showing how a tree can be picked up with the crown facing in either direction.
Figure 2B:
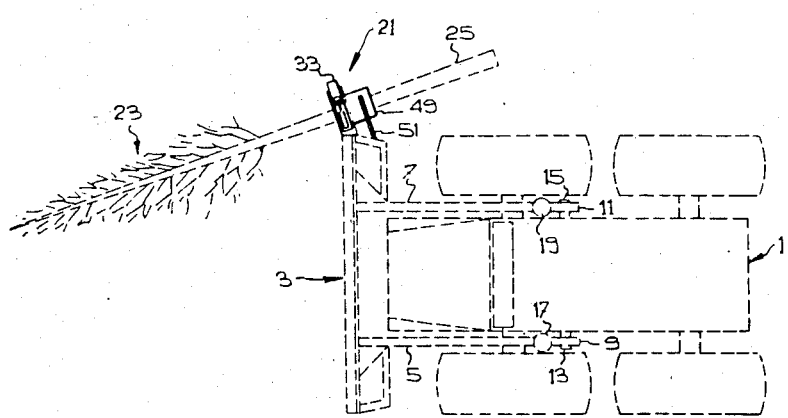

Preferably, the base 29 is mounted at a slight angle on the end of the blade so that the gripping means 21 angles slightly forwardly of the blade 3 as shown in FIGS. 2a, 2b. This permits the tree picked up to stay clear of the vehicle 1.

I claim:

1. In a vehicle for working in a forest, having a pusher blade mounted at one end thereof lying in a plane normal to a longitudinal axis of the vehicle, and means for moving the pusher blade up and down relative to the vehicle, the improvement comprising:

tree gripping means mounted laterally, of said axis of the vehicle on one end of the pusher blade and extendable outwardly therefrom to pick up trees lying on the ground, said tree gripping means comprising a base mounted vertically upon said one end of the blade, said base having a lower portion forming a fixed jaw, and a movable jaw mounted by a pivot pin on the base above the portion of said base forming the fixed jaw, and means for operating the tree gripping means to grip a tree lying on the ground, said operating means comprising an actuator for moving the movable jaw relative to the fixed jaw.

2. A vehicle as claimed in claim 1, wherein the movable jaw actuator is pivotally mounted at one end to the top end of the base and at the other end to a point of the movable jaw positioned outwardly of the pivot pin of said movable jaw.

3. A vehicle as claimed in claim 2, wherein the tree gripping means is mounted at an angle relative to the plane of said pusher blade so as to extend slightly forward of said blade.

4. A vehicle as claimed in claim 3, including a stop plate mounted on the blade adjacent to the movable and fixed jaws of the gripping means, said stop plate having a convex side facing the ground so as to prevent a tree from tilting up when gripped by the gripping means.

* * * * *